United States Patent [19]

Legrand

[11] Patent Number: 4,552,256

[45] Date of Patent: Nov. 12, 1985

[54] MOTOR, CLUTCH AND GEARING CONTROL

[76] Inventor: Jean Legrand, 24, rue Ernest Renan, 92310 Sevres, France

[21] Appl. No.: 445,835

[22] Filed: Nov. 30, 1982

[30] Foreign Application Priority Data

Dec. 9, 1981 [FR] France ................................ 81 22991

[51] Int. Cl.[4] ............................................. B60K 41/28
[52] U.S. Cl. .............................. 192/0.052; 192/0.076; 192/3.57; 192/103 R
[58] Field of Search ................ 192/0.052, 0.076, 0.075, 192/0.092, 3.58, 3.59, 3.57, 103 R, 103

[56] References Cited

U.S. PATENT DOCUMENTS

| | | | |
|---|---|---|---|
| 2,566,001 | 8/1951 | Thomas | 192/0.052 |
| 2,634,839 | 4/1953 | Price | 192/0.052 |
| 2,975,875 | 3/1961 | Edelblut | 192/0.052 |
| 3,322,248 | 5/1967 | Kaptur et al. | 192/0.052 |
| 3,327,817 | 6/1967 | Ivanchick | 192/0.052 |
| 3,379,291 | 4/1968 | Randol | 192/0.052 |
| 4,434,879 | 3/1984 | Lutz et al. | 192/0.052 |

FOREIGN PATENT DOCUMENTS 2343165 9/1977 France .
2430866 2/1980 France .

*Primary Examiner*—George H. Krizmanich
*Attorney, Agent, or Firm*—Young & Thompson

[57] ABSTRACT

A clutch system which provides an automatic coupling between an engine and a driven mechanism comprises a fluid-type servomotor connected to the clutch unit. The servomotor fluid passes through a circulation system comprising a progressively variable orifice, the cross-sectional area of which depends both on the position of the accelerator pedal and on the position of the clutch. A branch pipe placed in parallel with the circulation system is closed by a device which opens when the measured engine speed exceeds a predetermined threshold value. The branch pipe is provided with a second variable orifice which has a larger opening than the first and operates under the same conditions in order to increase the speed of clutch engagement.

17 Claims, 25 Drawing Figures

FIG_1

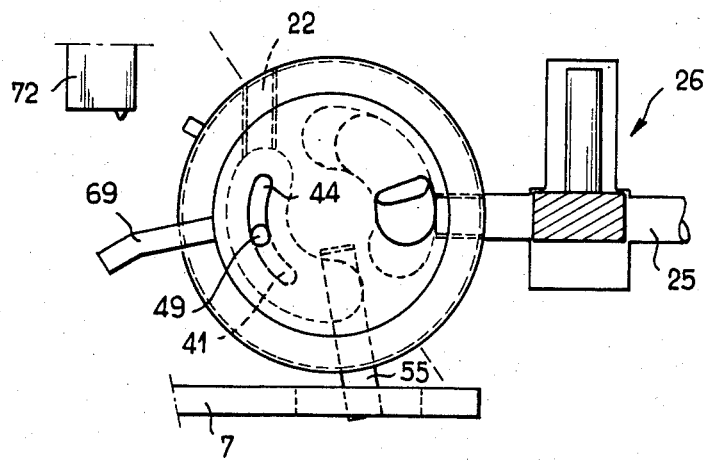
FIG._12
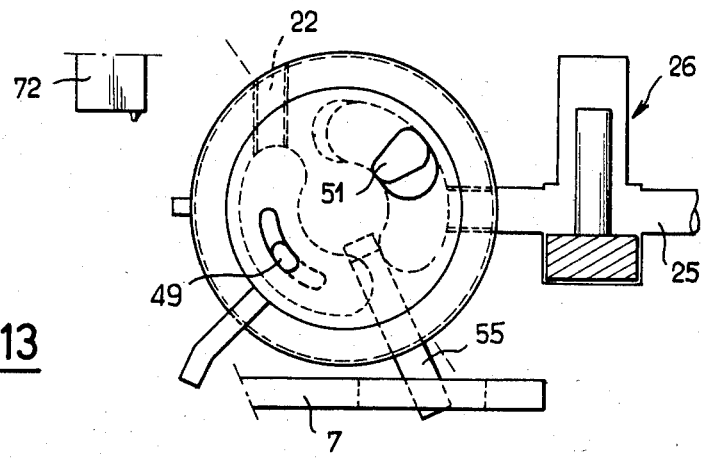
FIG._13
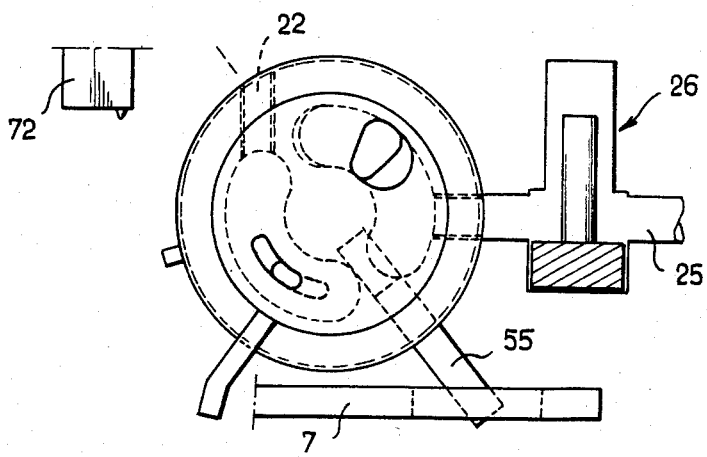
FIG._14

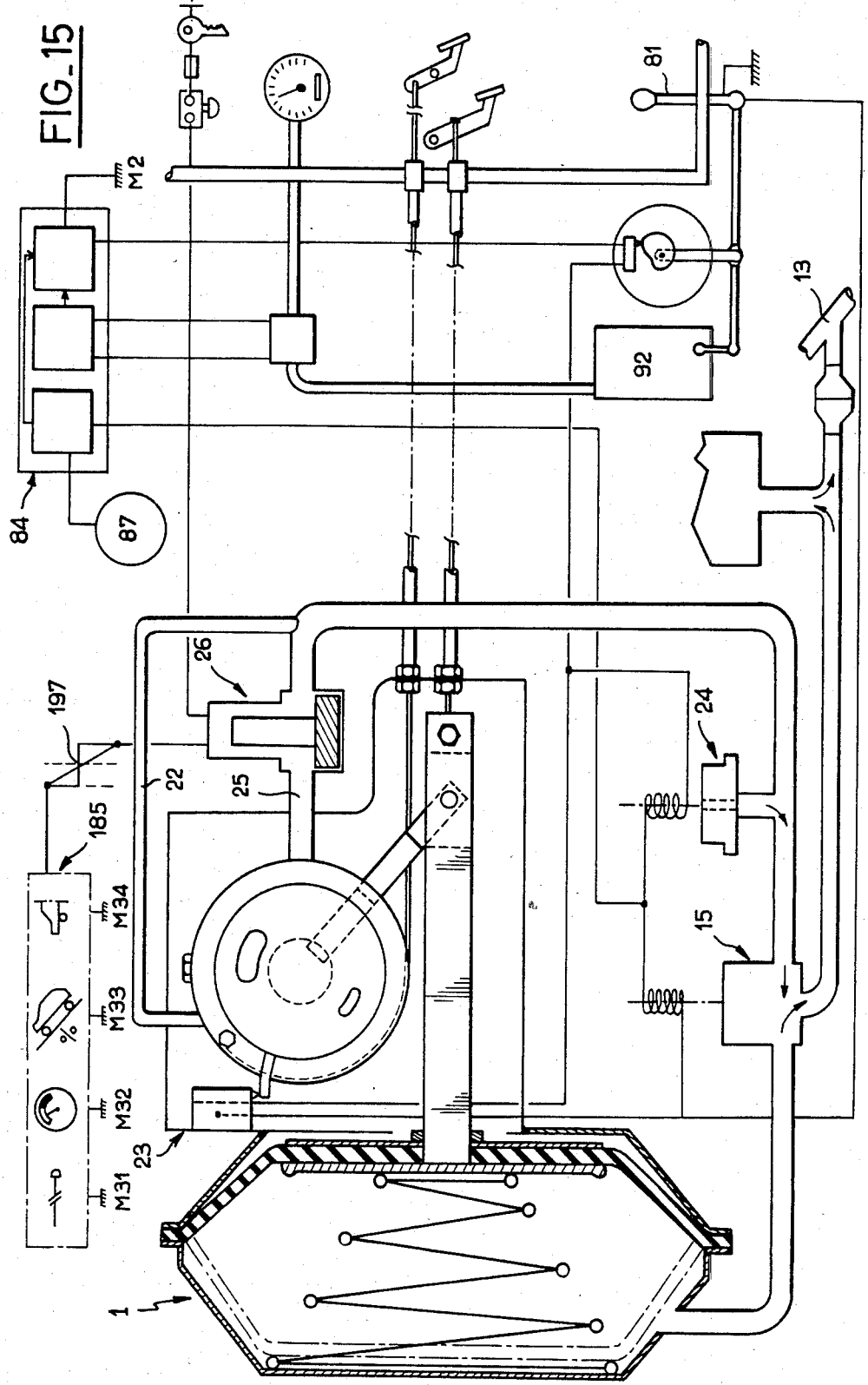
FIG_15

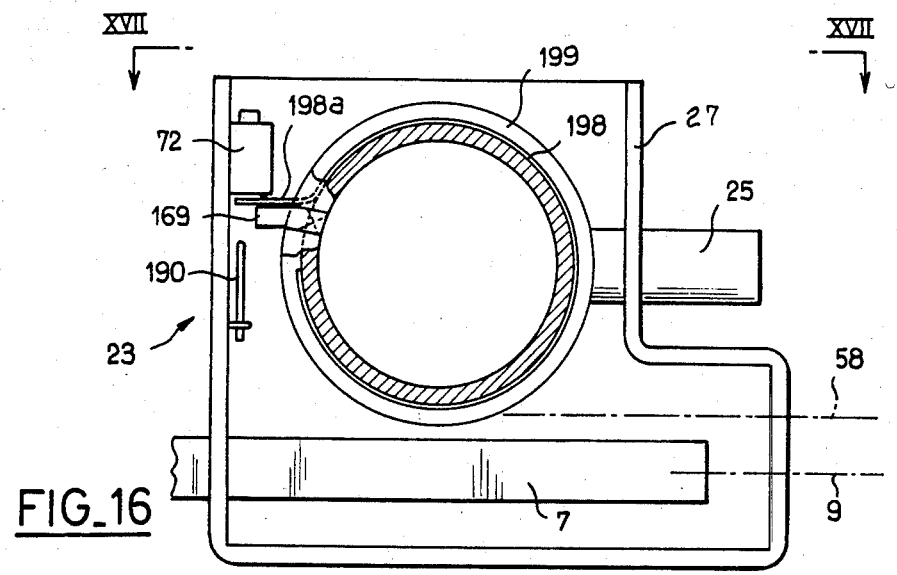
FIG_16
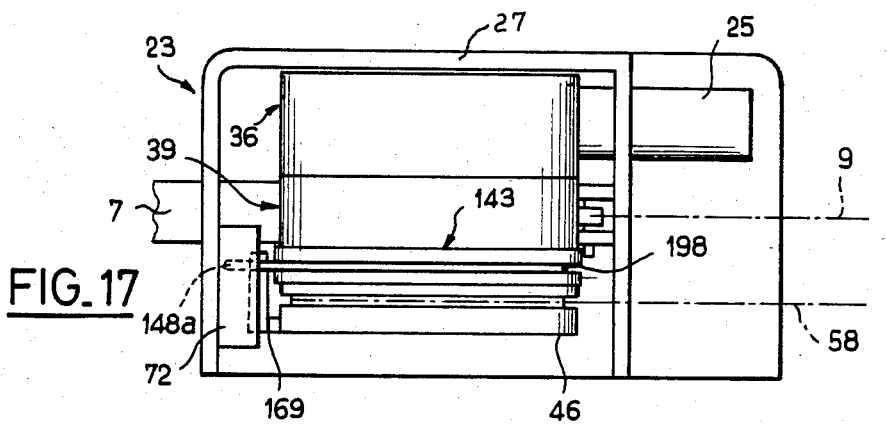
FIG_17
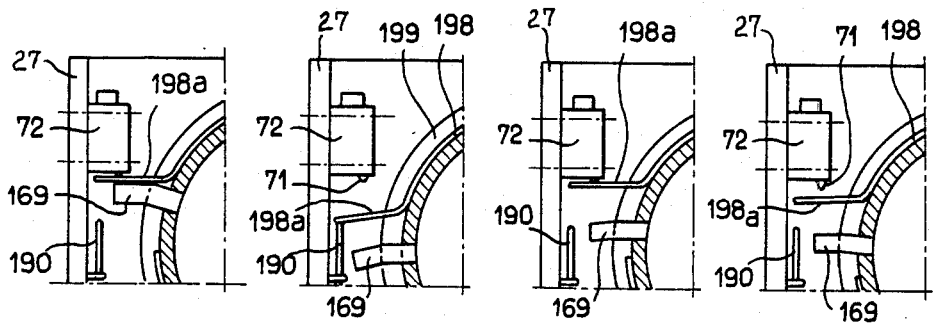
FIG_18  FIG_19  FIG_20  FIG_21

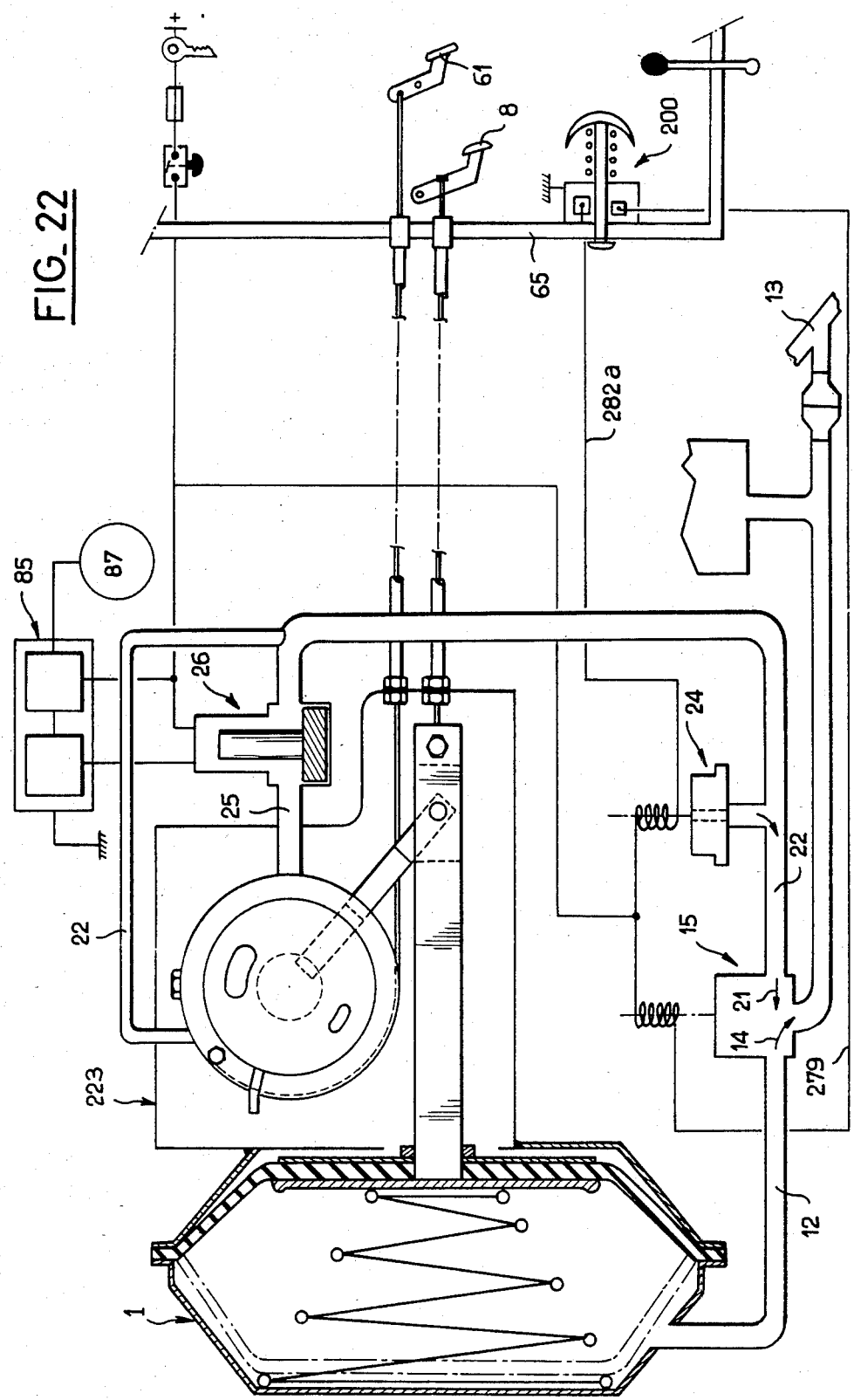
FIG_22

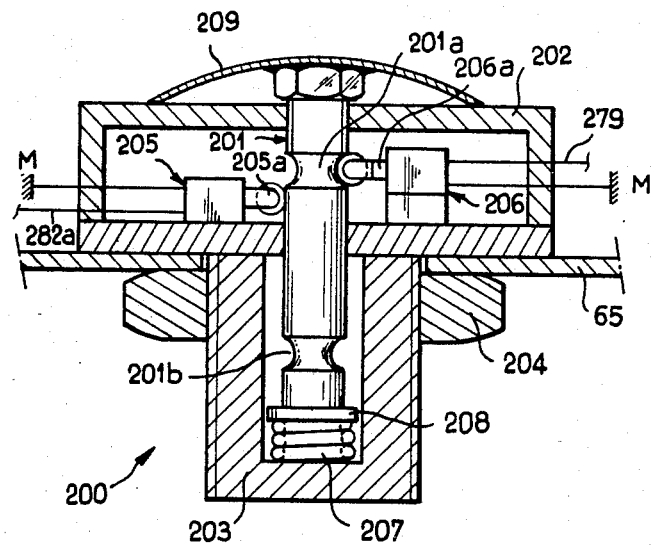
FIG_23
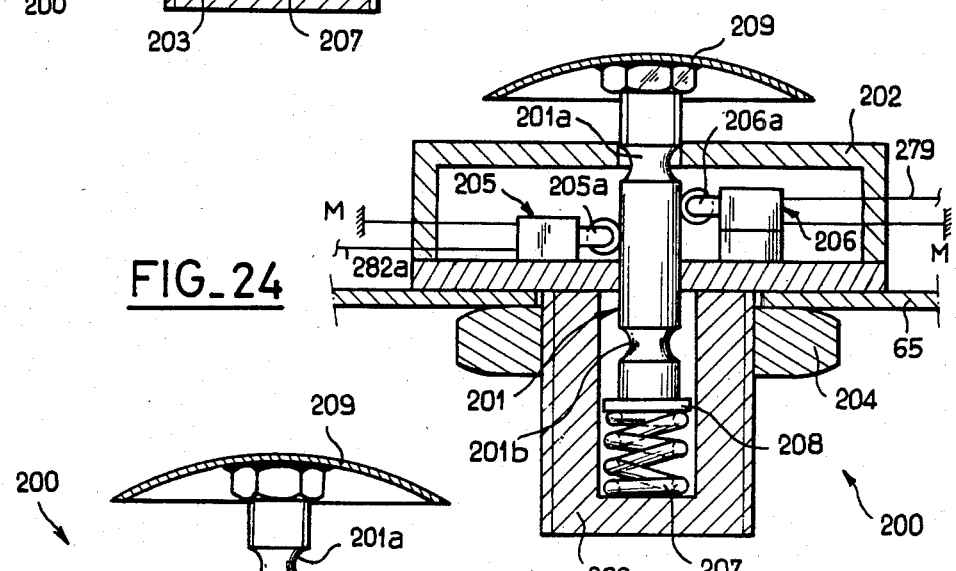
FIG_24
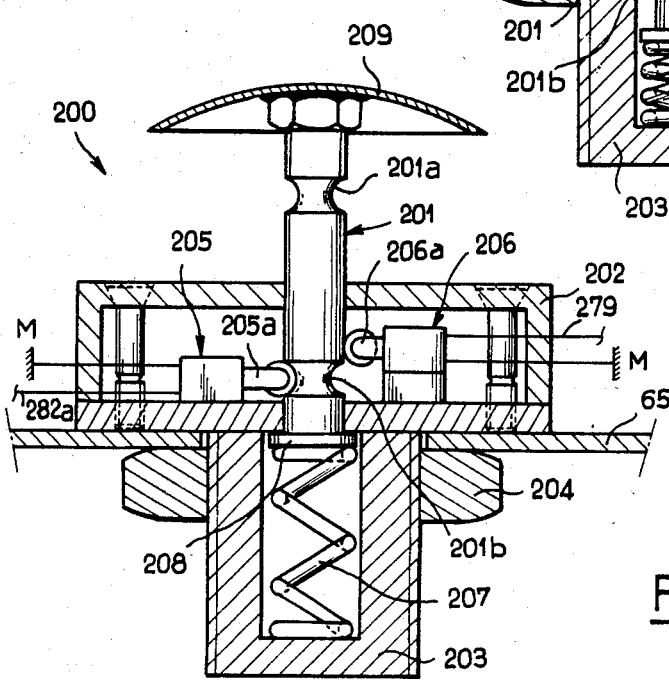
FIG_25

MOTOR, CLUTCH AND GEARING CONTROL

This invention relates to a clutch system which provides an automatic coupling between an engine and a driven mechanism, especially for automotive vehicles.

In many cases, known systems of this type comprise a fluid-type servomotor connected to a clutch unit. In such cases, the fluid usually consists of a vacuum taken from the induction manifold which admits the air-fuel mixture to the engine. The vacuum produces action on the servomotor in order to initiate clutch disengagement by means of a control system associated with the gearshift lever. An orifice having a small cross-sectional area is then opened in order to cause an admission of air which progressively restores the servomotor to the clutch-engagement position. The cross-sectional area of the orifice is related to the clutch unit in such a manner as to decrease in value as the clutch approaches the engaged position in order to achieve enhanced progressiveness.

The cross-sectional area of the orifice is also a function of the position of the accelerator in order to become larger as the engine rotates at a higher speed and thus increases the speed of clutch engagement. This accordingly makes it possible to some extent to achieve a rapid start or a slow start.

However, the variation in starting speed takes place over a limited range and practically rules out the possibility of "racing starts" at the same time as the possibility of very slow starting of a vehicle which is either very heavily loaded or has to be started from cold.

The object of the present invention is to provide an automatic clutch system of the type hereinabove defined which makes it possible to start vehicles at very different speeds.

In accordance with the invention, this object is achieved by means of at least a second variable orifice which is placed on a branch pipe of the discharge circuit, and the opening of which is also associated with the accelerator and with the clutch unit. Said branch pipe is provided with a closure device connected to actuating means which are controlled by the vehicle running conditions.

Depending on such running conditions as those which are imposed by the state of the vehicle, by the state of the road or even by the intentions of the driver, the branch pipe can be opened so as to permit a higher rate of discharge of the fluid and thus to permit progressive clutch engagement at higher speed.

It should be noted at this juncture that the driving fluid considered is a vacuum and that the discharge actually corresponds to an admission of air.

In a first embodiment of the invention, the branch-pipe closure device is connected to an engine speed detector in order to open when said engine speed exceeds a predetermined threshold value.

If the driver accelerates sharply as soon as the gear is engaged, clutch action takes place rapidly but otherwise the engagement is slow.

In a second embodiment which may also coexist with the first, the branch-pipe closure device is connected to a predetermined number of detectors for determining the conditions of operation of the vehicle in order to close when said conditions impose low-speed clutch engagement.

These detectors can consist in particular of a detector for the engine temperature, for the road gradient or for the load carried by the vehicle since these are conditions which may entail the need for slow starting.

Similarly, the branch-pipe closure device can be connected to a contact located within the gearbox in order to close the branch pipe when the bottom gear or reverse gear is engaged so as to impose slow clutch-engagement at the time of starting, fast clutch-engagement being reserved for shifting to higher gears.

In a practical embodiment of the invention, the system comprises a three-way electrovalve for selectively putting the servomotor into communication with the atmosphere by means of at least one of the variable orifices or with a fluid source which permits respectively progressive clutch-engagement and instantaneous disengagement.

The system further comprises a two-way electrovalve located on a pipe which serves to discharge to the atmosphere and is connected between the three-way valve and the variable orifices in order to complete engagement of the clutch and lock said clutch at the end of its progressive displacement.

The circuit for controlling the three-way electrovalve passes through a contact located within a gearshift lever and through a contact located on a gearbox in order to put the servomotor into communication with the fluid source when engaging a gear from neutral, thus producing automatic clutch release. The circuit for controlling the three-way electrovalve also passes through a contact which is responsive to the position of the accelerator when this latter is displaced in the direction of an increase in engine speed so that it is only necessary to accelerate in order to start-up while initiating progressive clutch-engagement.

The circuit for controlling the two-way electrovalve passes through the contact which is responsive to the position of the accelerator, through the contact located within the gearbox and through a contact which is responsive to a signal representing the speed of the vehicle in order to connect the servomotor directly to the atmosphere when the speed of the vehicle exceeds a predetermined threshold value.

When said threshold value is attained, it is considered that the starting operation has ended. Engagement of the clutch is then carried on to completion and the clutch is finally locked in position.

In an alternative embodiment, the circuits for controlling the three-way electrovalve and the two-way electrovalve pass respectively through contacts which are responsive to two end positions of a manual control device.

If the user so desires, it is possible to some extent by means of this simplified version to regain the impression of conventional three-pedal driving, at least in regard to the orders for initiating operations, whilst progressive clutch action is still ensured automatically.

Other features of the invention will be more apparent upon consideration of the following description and accompanying drawings, wherein:

FIGS. 9 to 14 are views illustrating the operation of the system;

FIG. 15 is a general diagram of a second embodiment of the invention;

FIG. 16 is a view which is similar to FIG. 2 in an alternative form of construction;

FIG. 17 is a view taken along line XVII—XVII of FIG. 16;

FIGS. 18 to 21 are views illustrating the operation of the device of FIGS. 16 and 17;

FIG. 22 is a general diagram showing a third embodiment of the invention;

FIGS. 23 to 25 are enlarged views of a portion of FIG. 22 in different positions of operation.

Figure 1:
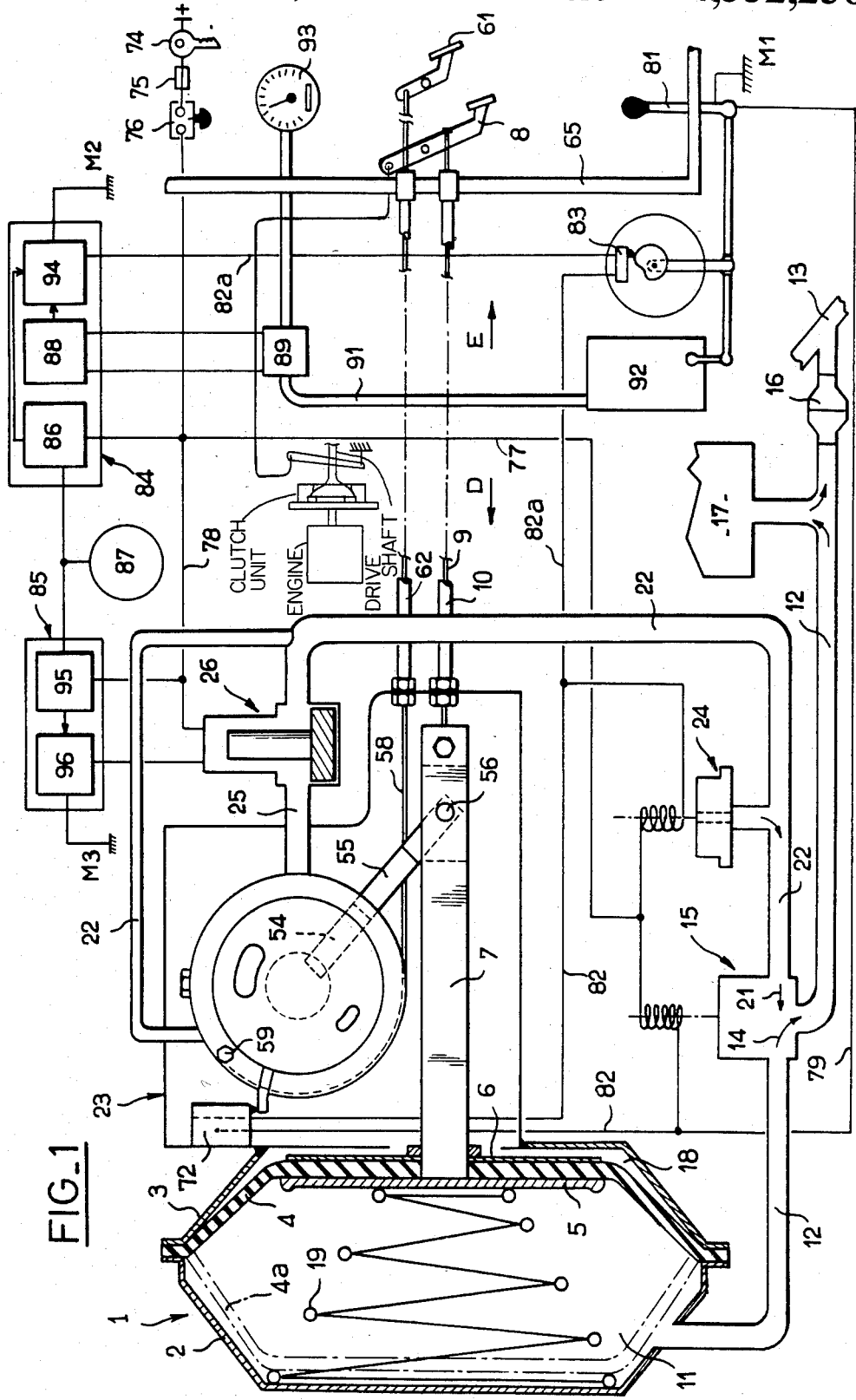
FIG. 1 is a general diagram of a first embodiment of the invention.

Referring to FIG. 1, the automatic clutch system comprises a servomotor 1 composed of two end-shields 2, 3 which serve to clamp a flexible diaphragm 4. The central portion of said diaphragm is also clamped between two rigid disks 5, 6 and these latter are rigidly fixed to an axial tie-bar 7 which is connected to a clutch pedal 8 by means of a cable 9 within a sheath 10.

The diaphragm 4 delimits with the end-shield 2 a fluid-tight enclosure 11 and this latter is connected by means of a pipe 12 to an induction manifold 13 of an engine forming a vacuum source by means of a passage 14 of a three-way electrovalve 15 and a non-return valve 16. A chamber 17 connected as a shunt off the pipe 12 forms a vacuum reserve.

In addition, the diaphragm 4 delimits an enclosed space 18 with the end-shield 3, said enclosed space 18 being continuously open to the surrounding atmosphere via the orifice which provides a passageway for the tie-bar 7.

A spring 19 is applied against the end-shield 2 and tends to apply the diaphragm 4 against the end-shield 3.

The clutch pedal 8 is also connected by means of a linkage of known type to a conventional clutch unit (not shown in the drawings).

It is understood that, when the enclosure 11 of the servomotor is put into communication with the vacuum source 13, the diaphragm 4 is applied at 4a against the end-shield 2 and compresses the spring 19. The assembly consisting of tie-bar 7 and cable 9 is then drawn towards the left-hand side of the figure and is accompanied by the clutch pedal 8 in the direction of downward displacement by reason of the fact that the cable 9 is attached to said pedal at a point located beyond the pedal fulcrum.

This movement corresponds to a clutch-disengagement (as indicated by the arrow D). On the contrary, if the enclosure 11 is put into communication with the surrounding atmosphere by the means which will be described hereinafter, the spring 19 will play a part in thrusting-back the diaphragm. A reverse movement thus takes place and permits upward return of the clutch pedal 8. This is the clutch-engagement operation (as indicated by the arrow E).

The flexible coupling provided by the cable 9 makes it possible to operate the clutch pedal 8 by foot in order to engage and disengage without any need to make use of the servomotor 1.

In another position, the electrovalve 15 provides a passageway 21 between the pipe 12 and a pipe 22 which terminates in a control unit 23 in order to permit the possibility of establishing a communication between said pipe 22 and the surrounding atmosphere. In addition, a two-way electrovalve 24 is mounted as a shunt off the pipe 22 in order to connect said pipe directly to the surrounding atmosphere without passing through the control unit 23.

A branch section 25 of the pipe 22 also terminates in the control unit 23. Said branch section is provided with a closure device 26 of the electrovalve type.

Referring now to FIGS. 2 to 8, the control unit 23 will now be described in detail.

Said control unit comprises a non-leaktight casing 27 which is attached to the end-shield 3 of the servomotor (as shown in FIG. 1) and into which the tie-bar 7 is adapted to pass freely. The cable 9 also penetrates into said casing and is attached to the tie-bar 7 by means of a fastening element 28, the cable sheath 10 being secured to the casing by means of a conventional screw fastening 29 and lock-nuts 31.

Figure 3:
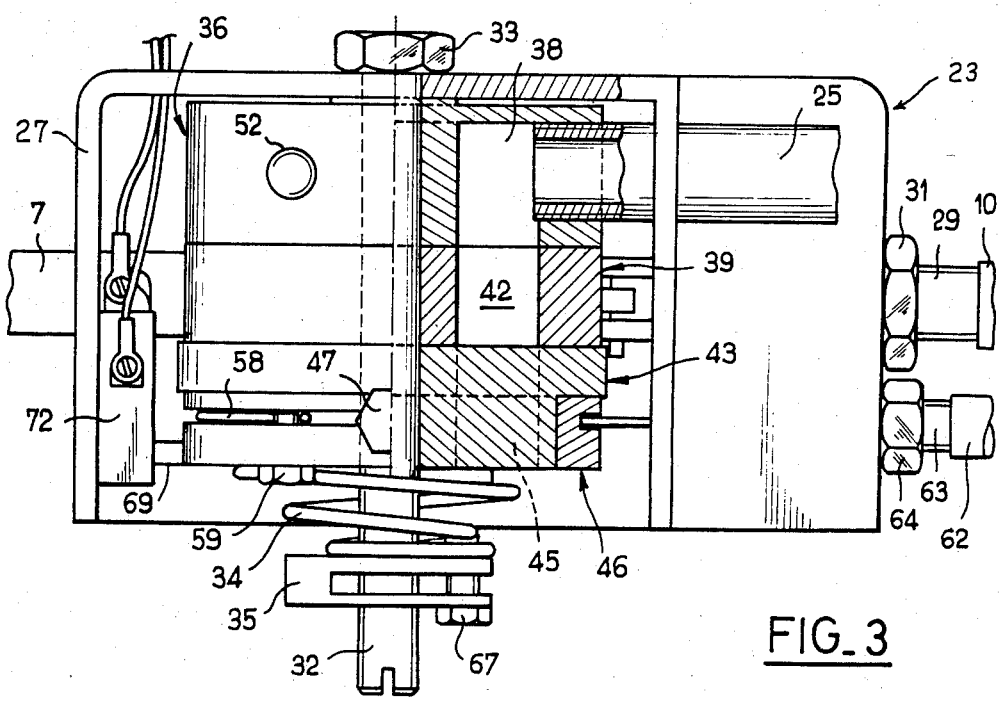
FIG. 3 is a part-sectional view taken along line III—III of FIG. 2.

A pin 32 which is threaded at both ends is screwed into the casing 27 and locked in position by means of a counter-nut 33 (as shown in FIG. 3). A number of parts are stacked on said pin and applied against each other by means of a spring 34 compressed by a split nut 35 which is screwed on the end of the pin 32.

Figure 6:
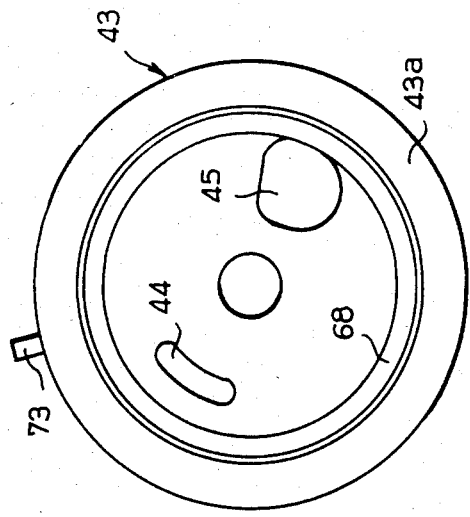
FIGS. 4 to 7 are views of component parts of the device of FIGS. 2 and 3.
Figure 5:
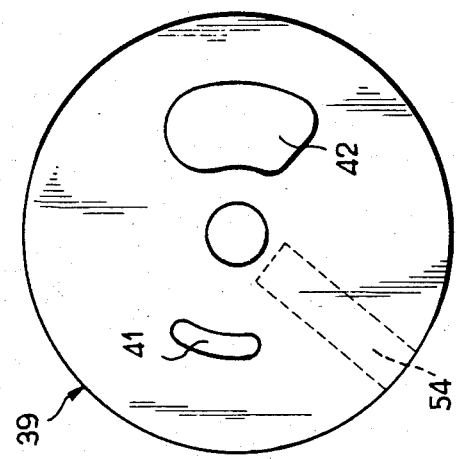
Figure 4:
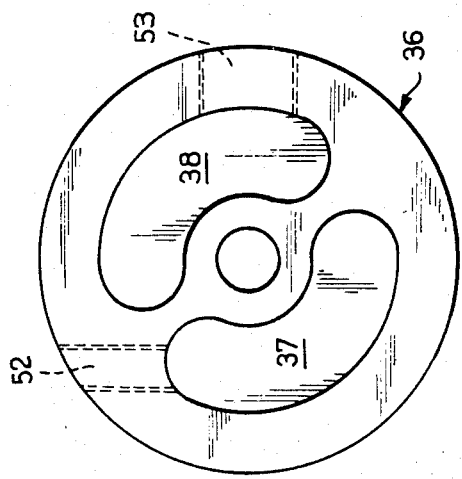

Considered from the rear end to the front or in other words from the counter-nut 33 to the nut 35, the above-mentioned stack consists of the following parts:

a cylindrical plate 36 (as shown in FIG. 4) which is rigidly fixed on the pin 32 and in which are formed two substantially symmetrical blind-end chambers 37, 38, the open ends of which are directed towards the front;

a cylindrical plate 39 (as shown in FIG. 5) applied against the plate 36 in fluid-tight sliding contact and having elongated slots 41, 42 so arranged as to be located opposite to the chambers 37, 38 of the plate 36 in certain relative positions of the two plates. The plate 39 is rotatably mounted on the pin 32 and the elongated slot 41 has a distinctly smaller cross-sectional area than the elongated slot 42;

a cylindrical plate 43 (as shown in FIG. 6) rotatably mounted on the pin 32 and adapted to cooperate in fluid-tight sliding contact with the plate 39. Said plate 43 is provided with two elongated slots 44, 45 arranged in approximately the same manner as the elongated slots of the plate 39 and capable of covering these latter at least partially in certain relative angular positions of the two plates.

Figure 7:
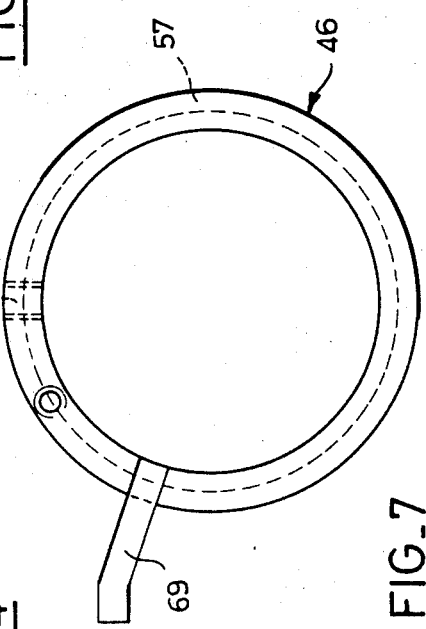

The plate 43 is provided on its front face with a peripheral recess 43a, a ring 46 being adapted to fit within said recess and rigidly coupled for rotation with the plate 43 by means of a clamping bolt 47 which is screwed into an internally-threaded portion 48 of said ring (as shown in FIG. 7).

Figure 8:
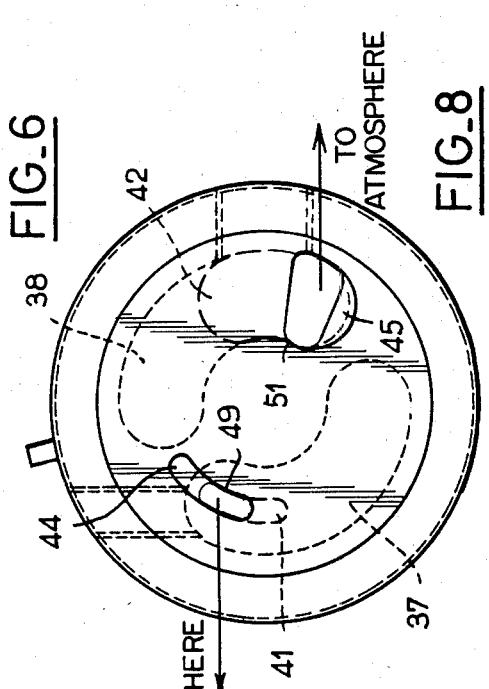
FIG. 8 is a view of the assembly of the components of FIGS. 4 to 7.

FIG. 8 shows the stack of plates which have just been described. It is observed that, in the position shown, the chambers 37 and 38 communicate with the surrounding atmosphere via respective orifices 49, 51, the cross-section of which is shaded in diagonal lines and is variable according to the relative angular positions of the different plates.

By reason of the fact that the pipe 22 and the branch section 25 are connected respectively to the chambers 37 and 38 by means of internally-threaded bores 52, 53 (as shown in FIG. 4), it is apparent that, when the passageway 21 of the electrovalve 15 is open, the enclosure 11 of the servomotor 1 is connected to the atmosphere by means of the variable orifice 49. In addition, if the closure device 26 is open, connection to the atmosphere also takes place in parallel via the variable orifice 51.

The means for varying the cross-sectional area of the orifices 49 and 51 by operating the plates 39 and 43 will now be described.

Figure 2:
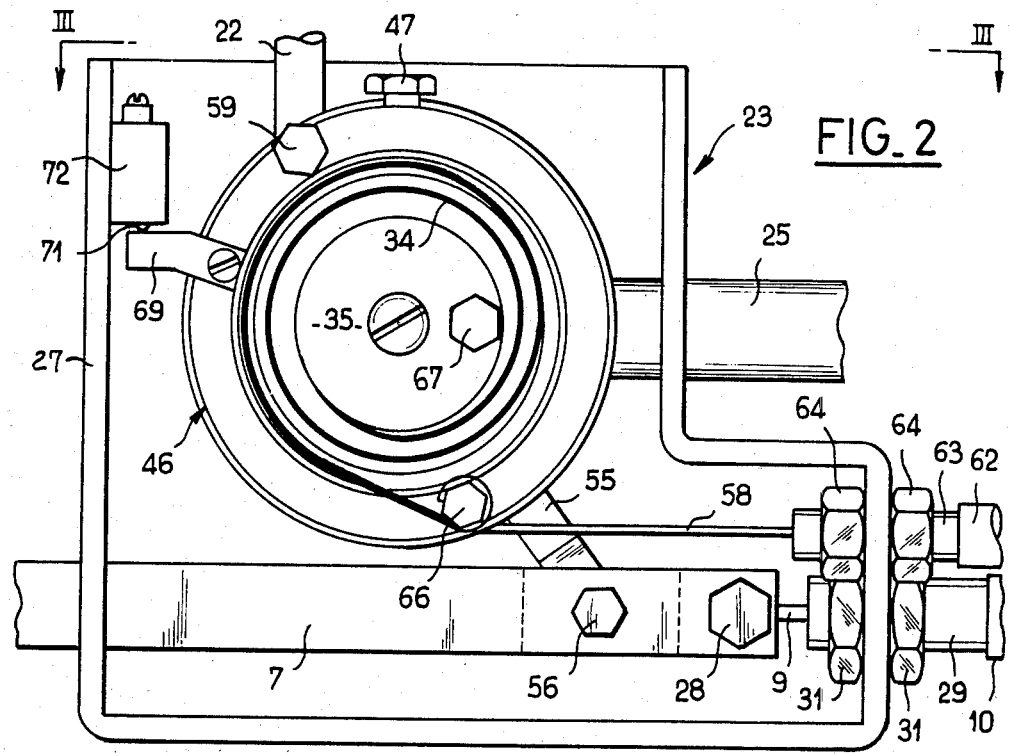
FIG. 2 is a view to a larger scale showing a portion of FIG. 1.

There is formed within the thickness of the plate 39 a radial cavity 54 (as shown in FIG. 5) in which is slidably mounted an arm 55, the outer end of which is pivotally attached to the tie-bar 7 at 56 (as shown in FIGS. 1 and 2). It is apparent that the translational movement of the tie-bar produces a movement of rotation of the plate 39. More specifically, clutch-disengagement (in the direction of the arrow D in FIG. 1) produces rotation of said plate 39 in the clockwise direction whereas clutch-engagement (in the direction of the arrow E) causes said plate to rotate in the anticlockwise direction.

As shown in FIG. 7, the ring 46 which is rigidly fixed to the plate 43 is provided with a peripheral groove 57 in which is wound a cable 58, one end of said cable being attached to said ring by means of a bolt 59 (as shown in FIGS. 1, 2, 3). The other end of said cable is attached to an accelerator pedal 61 beyond the fulcrum of said pedal (as shown in FIG. 1). It is apparent that the fact of depressing the accelerator pedal 61 initiates a movement of rotation of the assembly formed by the ring 46 and the plate 43 in the anticlockwise direction.

The cable 58 is placed within a sheath 62 which is secured to the casing 27 by means of a system comprising screws 63 and lock-nuts 64, the two sheathed cables 9 and 58 being also passed through the dashboard 65 of the vehicle.

One end of the compression spring 34 is attached to the ring 46 by means of a bolt 66 whereas the other end of said spring is attached to the split nut 35 by means of a bolt 67 which also serves to lock said nut in position and to provide the spring with the desired degree of torsion.

It is understood that the spring 34 also performs a torsional function which serves to return the assembly consisting of ring 46 and plate 43 in the clockwise direction. The projecting portion of the plate 43 is provided with a circular groove 68 (as shown in FIG. 6) which serves as a housing for the largest turn of the spring 34.

The ring 46 is adapted to carry a substantially radial arm 69 for depressing a push-button 71 of a switching device 72 fixed on the casing 23 when said ring reaches the end of travel in the clockwise direction.

Finally, the plate 43 is adapted to carry a lug 73 which is displaceable by hand in order to effect the initial adjustment of the device.

Referring again to FIG. 1, the electric circuits for controlling the electrovalves will now be described.

Said electrovalves are supplied with positive voltage from the battery (+) by means of an ignition key 74, a fuse 75 and a push-button 76 for putting the automatic clutch system into service along a line 77 in the case of the electrovalves 15 and 24, and a line 78 in the case of the closure device 26.

It will be noted that the electrovalve 24 is closed when it is excited and that the same applies to the closure device 26. The three-way electrovalve 15 opens the passage 14 when it is excited.

The circuit of the electrovalve 15 is closed in parallel via a line 79 on a ground M1 by means of a contact located within a gearshift lever 81 which closes as soon as the knob of the gearshift lever is touched, and via a line 82, 82a on a ground M2 by means of the switching device 72, of a contact 83 which is responsive to a displacement of the gearshift lever so as to open only in the neutral position, and of an electronic stage 84 which will be described in detail hereinafter.

The ground circuit of the electrovalve 24 is closed in parallel on the one hand on the ground M1 via the lines 82 and 79 in series by means of the switching device 72 and of the contact of the gearshift lever 81, and on the other hand on the ground M2 via the line 82a by means of the transmission or gearbox contact 83 and of the stage 84.

The ground circuit of the closure device 26 is closed on a ground M3 by means of an electronic stage 85.

The electronic stage 84 which is supplied from the battery comprises a stage 86 for counting pulses emitted by the ignition coil 87 of the engine of the vehicle and a pulse-counting stage 88 connected to an emitter 89 interposed on a flexible cable 91 which connects the gearbox 92 to a tachometer 93.

The two stages aforesaid are connected in parallel to a tripping stage 94 so arranged as to isolate the ground M2 when the speed of the engine exceeds a predetermined value or when the speed of the vehicle attains a predetermined threshold of fairly low value and, in both cases, with a view to putting the stage 84 solely in dependence on the engine speed in order to put the ground back in circuit when the engine speed falls below a predetermined threshold value which is very close to the slow-running speed.

The electronic stage 85 which is supplied from the line 78 comprises a counting stage 95 connected to the coil 87 and to a tripping stage 96 which is adapted to isolate the ground M3 when the engine speed exceeds a predetermined value.

Figure 11:
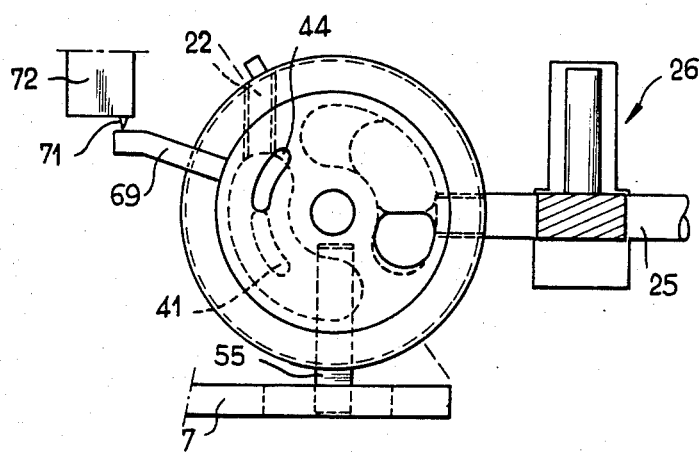

The system described in the foregoing involves preliminary mechanical adjustment of the control unit 23 with a view to ensuring that the elongated slot 41 of the plate 39 actuated by the clutch and the slot 44 of the plate 43 actuated by the accelerator pedal are tangent in order to define a zero-section orifice 49 (as shown in FIG. 11) when the accelerator pedal is in the slow-running position and the clutch is at the "grazing contact" point at which the clutch disks are only lightly in contact and therefore not capable of driving the vehicle.

At this "grazing contact" point, the elongated slots 42 and 45 are also tangent by design (as shown in FIG. 11).

In order to carry out the adjustment, the first step consists in slackening-off the bolt 47 whose function is to secure the ring 46 which is displaced by the accelerator pedal to the plate 43 provided with the elongated slot 44. Said plate is then displaced by hand by means of the lug 73 while the engine is running, the hand-brake is applied and the clutch is in the released position. After a first positioning, the bolt 47 is retightened and a test is carried out. Adjustments are then made by trial and error in order to achieve fineness of positioning.

Referring now to FIGS. 1 and 9 to 14, the operation of the system described in the foregoing will now be explained on the assumption that the initial mechanical adjustment has been made.

It will first be noted that, if the push-button 76 is in the open-contact position, the electrovalves are not excited. The enclosure 11 of the servomotor 1 is therefore continuously in communication with the surrounding atmosphere and the vehicle can be driven in the conventional manner with three pedals since the cable 9 is attached to the clutch pedal 8 in such a manner as to ensure that downward displacement of this latter produces no action on said cable.

Supposing that the above-mentioned contact is closed, that the engine is running and that the vehicle is in neutral, the line 79 is interrupted at the level of the gearshift lever 81 and the line 82a is interrupted at the level of the contact 83. The electrovalve 15 is therefore not excited and the passageway 21 is open.

For the same reasons, the electrovalve 24 is not excited either and is consequently open to the surrounding atmosphere.

The result thereby achieved is that the atmospheric pressure is exerted within the enclosure 11 of the servomotor which is in the position of FIG. 1 or in other words in the clutch-engagement position.

As soon as the driver grips the knob of the gearshift lever 81, the ground circuit 79 is closed on the ground M1, thus producing excitation of the electrovalves 15 and 24. The passageway 21 closes, the passage 14 opens and the electrovalve 24 closes. The enclosure 11 is then connected to the vacuum and the diaphragm 4 comes to position 4a, thus producing total clutch release.

When the driver engages bottom gear, the contact 83 closes the ground line 82, 82a on the ground M2, with the result that the electrovalves remain excited even after the gearshift lever has been released by the driver. In fact, the switching device 72 is closed as will become apparent hereinafter.

Figure 9:
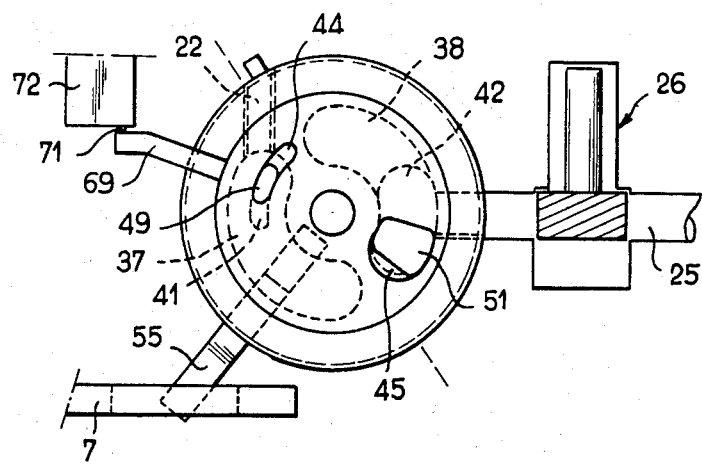

At this instant and from the beginning of the operation, the mechanism of the control unit 23 is in the position of FIG. 9. Partial superimposition of the elongated slots 41 and 44 allows clearance for an orifice 49 of relatively substantial width and the arm 69 maintains the switching device 72 in the closed position. A communication is therefore established between the surrounding atmosphere and the pipe 22. The same communication exists between the atmosphere and the branch pipe 25 via the orifice 51 which results from superimposition of the elongated slots 42 and 45 but the closure device 26 is closed since its ground circuit is closed on the ground M3.

Figure 10:
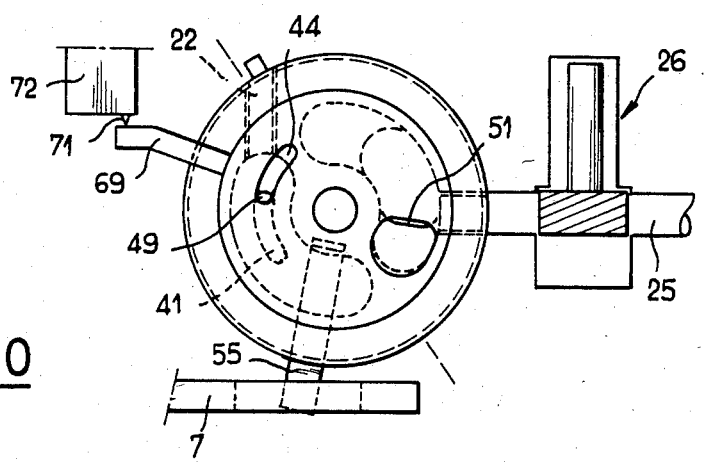

If the driver applies a light thrust on the accelerator pedal, the resultant movement of rotation of the arm 69 has the effect of opening the switching device 72, thereby interrupting the ground line 82. The electrovalve 15 closes the passage 14 and opens the passage 21 in order to connect the enclosure 11 to the surrounding atmosphere via the orifice 49. The admission of air has the effect of displacing the servomotor towards the clutch-engagement position (as indicated by the arrow E in FIG. 1), thereby causing the plate 39 to rotate in the anticlockwise direction and progressively reducing the cross-sectional area of the orifice 49 (as shown in FIG. 10).

The clutch disks thus reach the grazing-contact point (FIG. 11) at which the orifice 49 is completely closed, thus stopping the movement of clutch-engagement. This movement has been progressively slowed-down, thus practically removing any shock hazard in the event of slight mechanical disadjustment.

From this instant onwards, if the driver accelerates at any moment, the elongated slot 44 rotates in the anticlockwise direction, returns to an overlapping position with respect to the slot 41 and re-opens the orifice 49 (as shown in FIG. 12). The movement of clutch engagement is resumed, again at progressively reduced speed, with the result that starting can take place without any shock impact.

When the vehicle has attained a predetermined speed threshold which indicates that clutch-engagement has been practically completed, the counter 88 of the stage 84 (FIG. 1) which receives the pulses from the emitter 89 mounted on the control cable 91 of the tachometer 93 initiates a reversal of state of the tripping stage 94 which accordingly isolates the ground M2. The electrovalve 24 is de-energized and opens, thus connecting the enclosure 11 to the surrounding atmosphere via a fixed section. Clutch engagement is thus completed and locked since the enclosure 11 remains in communication with the atmosphere irrespective of any subsequent movements of the accelerator pedal.

The electrovalve 24 again comes into action when the driver changes speed without re-accelerating. After a clutch release resulting from action produced on the gearshift lever 81, said electrovalve permits instantaneous re-engagement without passing through the progressive starting procedure described earlier. The function of said electrovalve in the neutral position has also been noted in the foregoing.

It is apparent that the starting speed depends on the degree of acceleration applied after passing to the grazing-contact point which produces re-opening of the orifice 49 to a greater or lesser extent (as shown in FIG. 12). However, the small dimensions of the elongated slots 41 and 44 do not permit a very broad range of variation.

If the acceleration is rapid and exceeds 1.5 times the slow-running speed in the example described, the counter 95 of the stage 85 which receives the pulses of the ignition coil 87 initiates a reversal of state of the tripping device 96 which isolates the ground M3. The closure device 26 is de-energized and opens, thus putting the branch pipe 25 into service (as shown in FIG. 13), with the result that the airstream which flows through the large-section orifice 51 is added to the airstream which passes through the orifice 49, thus producing a substantial increase in speed of the servomotor and a very quick "get-away".

If a fast start is made impossible by conditions such as the load carried by the vehicle, the road gradient or low engine temperature, the motor slows-down and comes close to stalling speed. But once its speed has fallen below 1.5 times the slow-running regime, the closure device 26 re-closes, thus making it necessary for the driver to adopt a low-speed start. The system therefore performs an anti-stall function.

Once the vehicle is well on its way and traveling at normal speed, the system is in the position of FIG. 14 in which the clutch is locked. If the driver notices a distant obstacle, for example, and accordingly releases the accelerator pedal completely, the reduction in engine speed caused by slowing-down of the vehicle has the effect of putting the ground M2 back in circuit under the action of the counter 86 which is associated with the coil 87 and clutch-disengagement takes place automatically.

It is worthy of note that the system herein described permits and facilitates double-declutching. Furthermore, automatic driving can be given a personal touch by making changes in the shape of the elongated slots.

A second embodiment of the invention will now be described with reference to FIG. 15.

In this embodiment, the sole difference lies in the fact that the electronic stage 85 is replaced by another stage 185 which will be described. The only references recalled in FIG. 15 are those which are functionally the most important.

The ground line of the closure device 26 passes through a contact 197 which is located on the gearbox control and closes the line only if the bottom gear or the reverse gear is engaged. Said line is subsequently directed towards circuit grounds M31, M32, M33, M34 by means of contacts located within the stage 185 and actuated by a number of detectors (not shown) represented schematically in the drawings and corresponding from left to right in the figure to: choke in the open position, engine in the cold state, high road gradient, heavy vehicle load. These contacts are closed when the conditions mentioned above are satisfied, and are placed in parallel.

It is understood that, when any one of these conditions is present, only a low-speed start is permitted since the closure device 26 in this case is in the closed position.

By means of a series connection or a series-parallel connection of the contacts, steps can be made to ensure that low-speed starting is imposed only by the existence of a number of conditions at the same time. When higher gears are engaged, the contact 197 is opened, the stage 185 is cut out of circuit and rapid clutch-engagement is permitted.

Referring to FIGS. 16 to 21, there will now be described an alternative embodiment of the control unit 23. The main references designating parts which remain unchanged with respect to the embodiment of FIGS. 2 and 3 again appear in the figures aforesaid.

The plate 143 which is coupled to the accelerator (and corresponding to the plate 43 of the preceding embodiment) is provided with a peripheral external groove 199 in which is engaged a circular spring 198, said spring being applied against the bottom of the groove with a sufficient degree of friction to remain in position in the absence of any external action.

The lug 169 which is rigidly fixed to the ring 46 is elbowed so as to cooperate with an outwardly-curved end portion 198a of the spring 198 (as shown in FIG. 16). The switching device 72 is placed in such a manner as to ensure that its push-button 71 cooperates with the curved end portion 198a. Finally, a stationary pin 190 is rigidly fixed to the casing 27 of the control unit 23 and located opposite to the spring 198.

Initially, the system is in the position of FIG. 18 in which the lug 169 bears on the curved end portion 198a which in turn bears on the push-button of the switching device 72.

In a preliminary operation, the driver depresses the accelerator pedal, the transmission gears being in neutral. The outwardly-curved end portion 198a is arrested by the stationary pin 190 (as shown in FIG. 19) and the spring 198 slides within its groove and away from contact with the push-button 169.

When the driver releases the accelerator pedal, the new initial position is that of FIG. 20 in which the standby position of the accelerator corresponds to a higher engine speed.

The result obtained is that, at the time of starting shown in FIG. 21, the clutch-engagement operation initiated by the switching device 72 will take place at a higher engine speed. This accordingly makes it possible to revert to conventional starting at an overspeed regime which can be adjusted at will.

Referring to FIGS. 22 to 25, a third embodiment of the invention will now be described. In comparison with the embodiment of FIG. 1, this is a simplified form of construction in which the following elements have been suppressed: the contact within the gearshift lever, the gearbox contact 83, the electronic stage 84 and the switching device 72 of the control unit.

The elements which remain unchanged bear the same reference numerals as in FIG. 1.

The elements which have been suppressed are replaced functionally by a push-button device 200 to which lead the ground lines 279 and 282a of the respective electrovalves 15 and 24.

The device 200 comprises a shaft 201 in coaxial relation to a cylindrical casing 202 in which said shaft is slidably mounted (as shown in FIGS. 23, 24, 25). A closed cylinder 203 is rigidly fixed to the casing 202 and passes through the dashboard 65 of the vehicle on the lefthand side of the clutch pedal 8 as considered in the direction of travel. The cylinder 203 is threaded and adapted to carry a nut 204 which locks the complete assembly in position against the dashboard.

Provision is made within the casing 202 for two microswitches 205, 206 fitted with roller push-rods 205a, 206a which are applied against the shaft 201.

When the push-button 205a is depressed, the microswitch 205 connects the line 282a to a ground M. Conversely, when the push-rod 206a is in the projecting position, the microswitch 206 connects the line 79 to the ground M.

The shaft 201 is provided with grooves 201a, 201b in which the push-rod rollers are capable of engaging in the projecting position.

The microswitch 206 is located at a greater distance from the dashboard 65 than the microswitch 205 and the position of the grooves 201a, 201b is such that, in the completely depressed position of the shaft 201, only the push-rod 206a comes into a projecting position (as shown in FIG. 23) and that, in the fully released position of the shaft 201, the push-rod 205a alone comes into the projecting position (as shown in FIG. 25). In any other position of the shaft, the two push-rods are withdrawn.

A spring 207 applied against the bottom of the cylinder 203 tends to place the shaft 201 in the released position (as shown in FIG. 25), provision being made for an annular shoulder 208 which prevents ejection of the shaft. A cap 209 permits manual operation at the head end of said shaft.

In the position of FIG. 23, the two electrovalves 15 and 24 are energized. The passage 14 is therefore opened and the electrovalve 24 is closed. This is the clutch-release position.

In the position shown in FIG. 24, only the electrovalve 24 is energized and remains closed. On the other hand, the electrovalve 15 is de-energized and a communication is established between the servomotor and the surrounding atmosphere by means of the control unit 223. This is the position of progressive clutch-engagement.

In the position of FIG. 25, both electrovalves are de-energized. The electrovalve 24 is open and the clutch is fully engaged and locked.

When the driver exerts a downward thrust on the shaft 201, the device assumes the state shown in FIG. 23, the ground M energizes the electrovalve 15 and clutch disengagement then takes place. The electrovalve 24 is energized and closed to the surrounding air but it would in any case produce no action since the passageway 21 of the electrovalve 15 is closed to any admission of surrounding air.

When the driver releases the shaft 201 to a slight extent in the bottom gear or reverse position while accelerating progressively, the electrovalve 15 is deenergized by interruption of the ground M, is cut-off from the vacuum source 13 and permits admission of atmospheric air under conditions which are similar to those already described with reference to FIG. 1. In other words, the air passes through the pipe 22 alone or through both the pipe 22 and the branch section 25. It is only after the shaft 201 has moved upwards to the full extent (as shown in FIG. 25) that the de-energized electrovalve 24 is opened to the surrounding air and that the end of the clutch-engagement produced by admission of atmospheric air is no longer under the driver's control, which has no effect on the progressive action of the clutch at this stage.

When the driver shifts from one gear to another, he can allow rapid upward return of the shaft 201 since the flow cross-section of the electrovalve 24 is sufficiently small to prevent any jerks.

This particular arrangement of the system also permits double-declutching. It also enables the driver to start the vehicle at an overspeed regime if he delays release of the push-button device after commencement of acceleration. The essential advantage of this embodiment, however, lies in its greater ease and simplicity of assembly.

As will readily be apparent, the invention is not limited to the example hereinabove described but extends to any technological variant within the scope of those versed in the art. Thus the driving fluid employed need not necessarily be a vacuum but could be a fluid under pressure.

Similarly, consideration could be given to a plurality of branch pipes such as the pipe-section 25. In such a case, each branch pipe would be provided with a variable orifice which can be selectively closed as a function of stepped engine-speed values.

What is claimed is:

1. In an automatic clutch system which provides an automatic coupling between an engine and a driven mechanism, especially for automotive vehicles, comprising a fluid-type servomotor connected to a clutch unit, means for producing action of an energizing fluid for the servomotor in a direction of clutch disengagement, a discharge circuit for discharging fluid from the servomotor, and clutch progressiveness means comprising two members mechanically connected respectively to an accelerator pedal of the engine and to the clutch unit and together defining between them at least one variable orifice in said discharge circuit to modify the action of said servomotor in a direction of clutch engagement in such a manner as to ensure that a cross-sectional area of the at least one orifice tends to decrease when the clutch unit moves towards an engaged position and that said cross-sectional area tends to increase when the accelerator pedal is displaced so as to increase the engine speed; the improvement in which said system further comprises in said discharge circuit, flow area varying means responsive to at least one running condition of the vehicle other than position of the clutch unit or of the accelerator pedal, said flow area varying means being adapted to adjust in said circuit, as a function of said at least one running condition, a flow sectional area for said fluid flowing through the at least one variable orifice.

2. A clutch system according to claim 1, wherein said discharge circuit comprises two parallel subcircuits, the flow area varying means comprises a subcircuit valve valve on one of the sub-circuits, and the clutch progressiveness means comprise a variable orifice in each of the sub-circuits.

3. A clutch system according to claim 2, wherein the variable orifice in the sub-circuit having the sub-circuit valve is larger than the other variable orifice at each relative position of the clutch unit and of the accelerator pedal.

4. A clutch system according to claim 1, wherein the flow area varying means is connected to an engine speed detector in order to increase said flow sectional area when speed of the engine is increasing.

5. A clutch system according to claim 1, wherein the flow area varying means is connected to a predetermined number of detectors responsive to operation conditions of the vehicle which are other than speed of the engine.

6. A system according to claim 2, wherein the flow area varying means is connected to a contact located on a gearbox control unit in order to close said sub-circuit valve when the gearbox control unit is shifted into a lowest gear or a reverse gear.

7. A system according to claim 1, comprising a three-way electrovalve for selectively putting the servomotor into communication with a fluid source or with a surrounding atmosphere through the at least one variable orifice.

8. A system according to claim 7, wherein a circuit for controlling the three-way electrovalve passes through a contact located within a gearshift lever.

9. A system according to claim 7, wherein a circuit for controlling the three-way electrovalve passes through a contact located on the gearbox control unit in order to put the servometer into communication with the fluid source when engaging a gear from neutral, through a contact located within an electronic stage which is responsive to the engine speed and to the vehicle speed, and through a contact which is responsive to the position of the accelerator pedal in order to open when said pedal is displaced in the direction of an increase in engine speed.

10. A system according to claim 9, wherein said system comprises a release electrovalve controlling communication of said discharge circuit with the atmosphere between the three way valve and the at least one variable orifice, and a circuit for controlling said release electrovalve, said circuit passing through the contact which is responsive to the position of the accelerator pedal, through the contact located on the gearbox and through a contact which is responsive to a signal representing the vehicle speed in order to connect the servomotor to the atmosphere through the release electrovalve when the vehicle speed exceeds a predetermined threshold value.

11. A system according to claim 9, wherein said system comprises a release electrovalve controlling communication of said discharge circuit with the atmosphere between the three way valve and the at least one variable orifice, and a circuit for controlling said release electrovalve, said circuit passing through the contact which is responsive to the position of the accelerator pedal, through the contact located on the gearbox and through a contact which is responsive to a signal representing the engine speed in order to connect the servomotor to the atmosphere through the release electrovalve when the engine speed exceeds a predetermined threshold value.

12. A system according to claim 10, wherein the circuits for controlling the three-way electrovalve and the release electrovalve pass respectively through contacts which are responsive to two end positions of a manual control member.

13. A system according to claim 2, wherein each variable orifice is constituted by two elongated slots in superimposed relation, said slots being formed in two respective members which are adapted to cooperate with each other in sliding motion, one of said members being connected to the accelerator pedal and the other member being connected to the clutch unit.

14. A system according to claim 13, wherein the two members aforesaid each have two elongated slots, each slot being adapted to correspond to one of the variable orifices.

15. A system according to claim 14, wherein the variable orifice placed on the sub-circuit provided with the flow area varying valve has a larger opening than the other orifice in any position of at least partial superimposition of the elongated slots.

16. A system according to claim 15, wherein the member connected to the accelerator pedal is adapted to carry an arm for actuating the contact through which the control circuit of the three-way electrovalve passes.

17. A system according to claim 16, wherein the actuating arm is capable of displacement in sliding motion on the member which carries said arm.

* * * * *